United States Patent
Luo

(10) Patent No.: US 10,517,345 B2
(45) Date of Patent: Dec. 31, 2019

(54) SYSTEM AND METHOD FOR SECURING EYEWEAR

(71) Applicant: Jian Luo, Yorba Lina, CA (US)

(72) Inventor: Jian Luo, Yorba Lina, CA (US)

(*) Notice: Subject to any disclaimer, the term of this patent is extended or adjusted under 35 U.S.C. 154(b) by 0 days.

(21) Appl. No.: 15/893,608

(22) Filed: Feb. 10, 2018

(65) Prior Publication Data

US 2019/0246731 A1    Aug. 15, 2019

(51) Int. Cl.
*G02C 3/02*    (2006.01)
*A42B 1/24*    (2006.01)
*G02C 3/00*    (2006.01)
*G02C 5/14*    (2006.01)

(52) U.S. Cl.
CPC .............. *A42B 1/248* (2013.01); *A42B 1/247* (2013.01); *G02C 3/006* (2013.01); *G02C 5/143* (2013.01); *G02C 2200/02* (2013.01)

(58) Field of Classification Search
CPC .................................. G02C 3/003; G02C 3/02
USPC ............................ 351/155; 2/209.13, 175.1
See application file for complete search history.

(56) References Cited

U.S. PATENT DOCUMENTS

| | | | | |
|---|---|---|---|---|
| 2006/0152671 | A1* | 7/2006 | Risso | A42B 1/247 351/155 |
| 2009/0284712 | A1* | 11/2009 | Brooks | A42B 1/247 351/155 |
| 2014/0063443 | A1* | 3/2014 | Berger | A42B 1/247 351/155 |

* cited by examiner

Primary Examiner — Hung X Dang
(74) Attorney, Agent, or Firm — Xu Li

(57) ABSTRACT

A principal objective of the present invention is to provide system for temperately retaining eyeglasses on a user's headwear. This objective is achieved by incorporating magnetic elements on the headwear and eyewear of the user. In one embodiment of the present invention, two magnetic elements are attached to the inside surfaces of the two temple arms of a pair of eyeglasses. Another two magnetic elements are attached to the two sides of a hat permanently or removably. The polarities of the magnetic elements are arranged in such way that when the two temple arms of the eyeglasses are placed in contact to the two sides of the hat from the outside of the hat, the magnetic elements on the eyeglasses and the magnetic elements on the headwear form magnetic element coupling pairs with attraction magnetic force. When the eyeglasses are not in use and need to be temporarily stored away from the eyes, the user can lift them to the crown or above the brim of the hat. The corresponding magnetic element coupling pairs will attach the temple arms of the eyeglasses to the side of the hat.

8 Claims, 15 Drawing Sheets

SYSTEM AND METHOD FOR SECURING EYEWEAR

REFERENCE TO RELATED APPLICATIONS

This application claims priority of U.S. Provisional Application No. 62/48,732, filed on Apr. 19, 2017.

BACKGROUND OF THE INVENTION

The present disclosure relates generally systems and methods for securing eyewear to the wearer.

Users of eyewear desire to secure their glasses, both in the situations of while using the glasses and when the glasses are temperately removed from the using position. Cords, chains, and pin mechanisms have been used in securing eyewear to the user or on headwear and garments. For example, various mechanisms have been proposed to secure eyewear to the user's hat while the eyewear is in a temporary unused position. However, there is continuous need for a convenient, portable, flexible, safe and inexpensive way to secure eyewear to the users.

SUMMARY OF THE INVENTION

A principal objective of the present invention is to provide system for temperately retaining eyeglasses on a user's headwear. This objective is achieved by incorporating magnetic material on either one of or both the headwear and eyewear of the user. Here, headwear is a garment covering the wearer's head, including and not limited to: hat, cap, headband, head scarf, etc. Eyeglasses are a pair of lenses set in a frame resting on the wearer's nose and ears, used to assist defective eyesight or to protect the eyes, or to change the looks of the wearer.

In a broad aspect, the present invention removably attaches a pair of eyeglasses to the user's headwear using the attraction magnetic force between pairs of magnetic coupling elements. Throughout the present description, a magnetic element is an element made of magnetic or ferromagnetic material. A magnetic element coupling pair comprises a first magnetic element and a second magnetic element, wherein the two magnetic elements interact with each other with attraction magnetic force. For example, a magnetic element coupling pair may comprise a pair of magnets arranged with opposite polarity adjacent to each other. Alternatively, a magnetic element coupling pair may comprise a magnet and an element made of or containing a ferromagnetic material. In the latter scenario, either of the first magnetic element or the second magnetic element is a magnet, and the other magnetic element is a ferromagnetic element. Examples of ferromagnetic materials include, and are not limited to, iron, stainless steel, and other alloys and compounds containing iron and other ferromagnetic metals.

In one embodiment of the present invention, two magnetic elements are attached to the inside surfaces of the two temple arms of a pair of eyeglasses. Another two magnetic elements are attached to the two sides of a hat. The magnetic elements are arranged in such way that when the two temple arms of the eyeglasses are placed in contact to the two sides of the hat from the outside of the hat, the magnet elements on the eyeglasses and the magnetic elements on the hat form two magnetic element coupling pairs. When the eyeglasses are not in use and need to be temporarily stored away from the eyes, the user can lift them to the crown of the hat the two magnetic element coupling pairs will attach the temple arms of the eyeglasses to the side of the hat using magnetic attraction force. Alternatively, if desired, the eyeglasses can be placed so that the lenses are positioned at the back of the user's head, still secured to the hat with the magnetic element coupling pairs.

Variations can be made to the above embodiment of the present invention. In one embodiment, the magnetic elements are removably attached to the hat or eyeglasses. In another embodiment, the magnetic elements are non-removably into the structure to the hat or the eyeglasses. In another embodiment, the temple arms of the eyeglasses are completely or partially made of or covered by magnetic or ferrous metallic material, thus eliminating the need for any add-on structures on the eyeglasses.

BRIEF DESCRIPTION OF THE DRAWINGS

Embodiments of the present invention will now be described, by way of example only, with reference to the following drawings, in which.

Figure 1A:
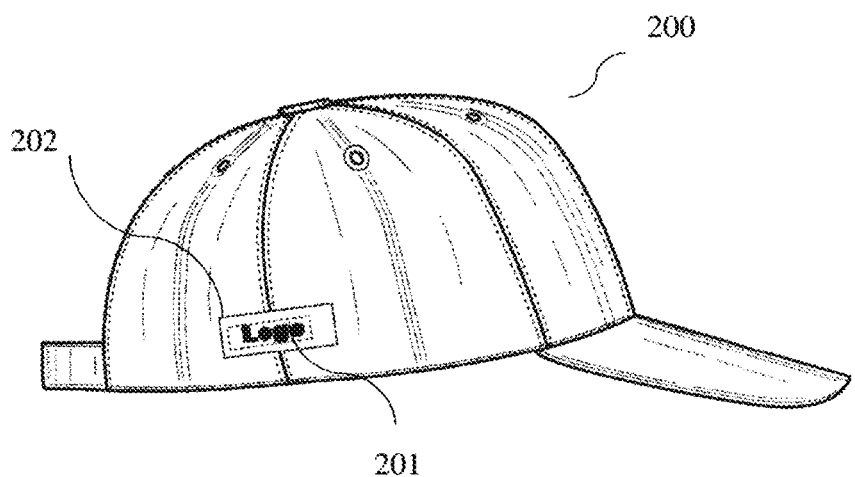
FIG. 1A is a side view of a hat in one embodiment of the headwear portion in the eyewear securing system.

In the drawings, the reference numerals are listed below:
200—hat
201—hat magnetic element
202—hat decorative label
203—complementary hat magnetic element
205—hat magnetic element clip
206—hat magnetic element concavity
210—hat right side
211—hat left side
310—eyeglasses
311—eyeglasses magnetic element
313—integrated magnetic eyeglasses leg portion
314—roped-shaped magnetic element attachment.
315—eyeglasses removable magnetic element
316—complementary eyeglasses magnetic element
320—eyeglasses right temple arm
321—eyeglasses left temple arm

DETAILED DESCRIPTION OF THE INVENTION

The following detailed description includes preferred embodiments of the invention. The description is not to be taken in a limiting sense, but is made merely for the purpose of illustrating the general principles of the invention.

Figure 1B:
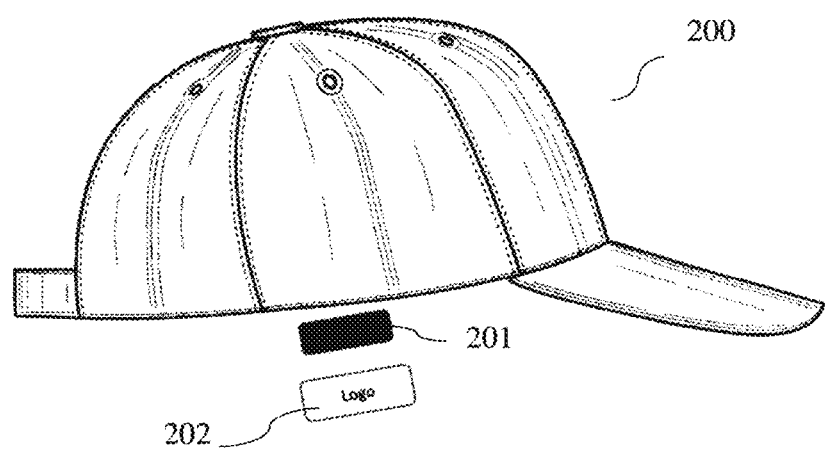
FIG. 1B is an exploded side view of the hat in FIG. 1A.
Figure 1C:
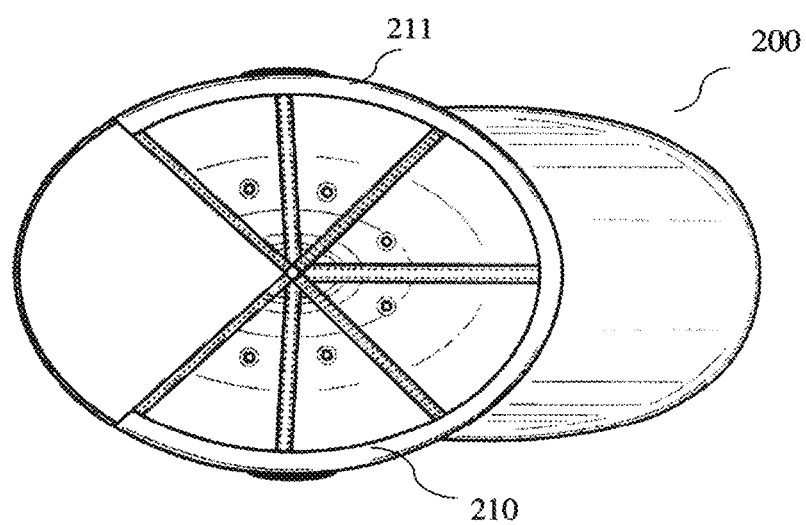
FIG. 1C is a top view of the hat in FIG. 1A.

FIGS. 1A-1C illustrates an embodiment of the headwear portion in the eyewear securing system. FIG. 1A is a side view of a hat with magnetic elements fastened to the outside of the hat and covered with decorative labels FIG. 1B is an exploded side view of the hat with magnetic elements and labels. FIG. 1C is a top view of the hat with magnetic elements and labels fastened on both sides (210 and 211) of the hat. In this embodiment, two magnetic elements (201) are fastened to the outside of a hat (200), one on each side (210 or 211), and covered with decorative labels (202). The labels (202) can be made of metal, plastic, textile, or other suitable materials. The labels 202 may also function as means for fasting the magnets or ferrous components (201) to the hat by being sewn to, glued to, riveted to or otherwise attached to the hat.

In an alternative embodiment, the two hat magnetic elements (201) are fastened to the headwear directly without decorative labels (202). They can take the shape and design of decorative badges themselves and are glued to, sewn to, or riveted to or otherwise fixed to the hat.

Figure 2A:
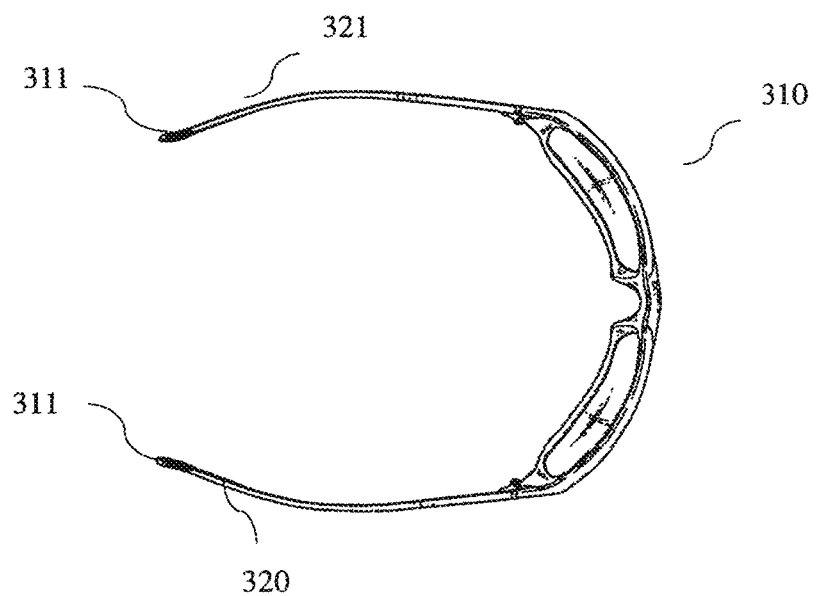
FIG. 2A illustrates an embodiment of a pair of eyeglasses with magnetic elements fixed on the ends of the two temple arms.
Figure 2B:
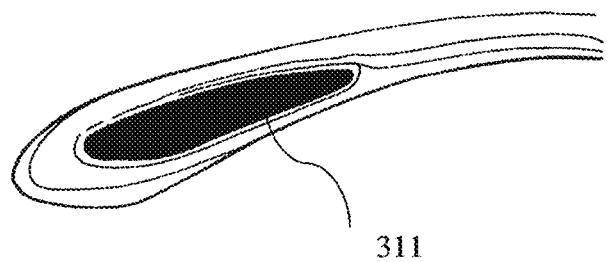
FIG. 2B is the enlarged view of the end of one of the two temple arms of the eyeglasses with a magnetic element attached to the inside surface.
Figure 3:
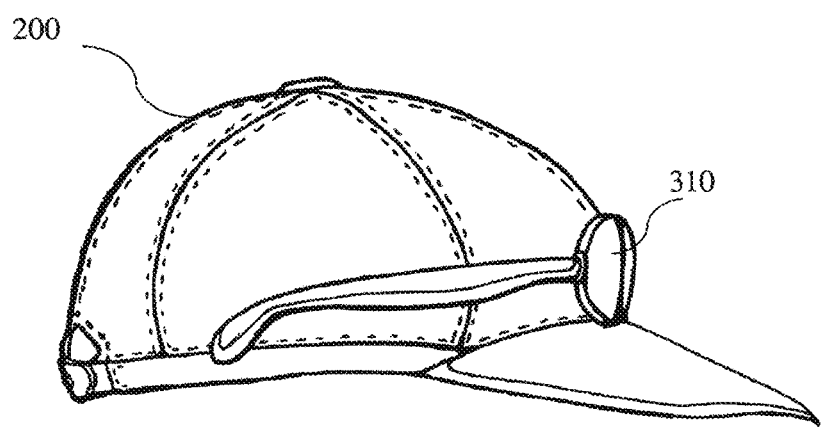
FIG. 3 is a perspective side view of the eyeglasses in FIGS. 2A and 2B secured to the hat in FIGS. 1A-1C by forming two magnetic element coupling pairs.

FIG. 2A illustrates an embodiment of a pair of eyeglasses (310) with magnetic elements (311) fixed on the ends of the two temple arms (320 and 321). FIG. 2B is the enlarged view of the end of one of the two temple arms (320 or 321) of the eyeglasses with a magnetic element (311) attached to the inside surface. The shape of the magnetic element (311) can vary to accommodate the design of the temple arms. The magnetic elements (311) are glued to, or otherwise fixed to the inner surfaces of the two ends of the two temple arms of the eyeglasses. The magnetic elements (311) are selected so that they form two magnetic element coupling pairs with the two the hat magnetic elements (201). Therefore, when the two temple arms (320 and 321) of the eyeglasses are placed in contact to the two sides (210 and 211) of the hat from the outside of the hat, the eyeglasses magnetic elements (311) are attracted to the hat magnetic elements (201). FIG. 3 is a side view of the eyeglasses in FIG. 2 secured to the hat in FIG. 1 by forming two magnetic element coupling pairs.

Figure 4A:
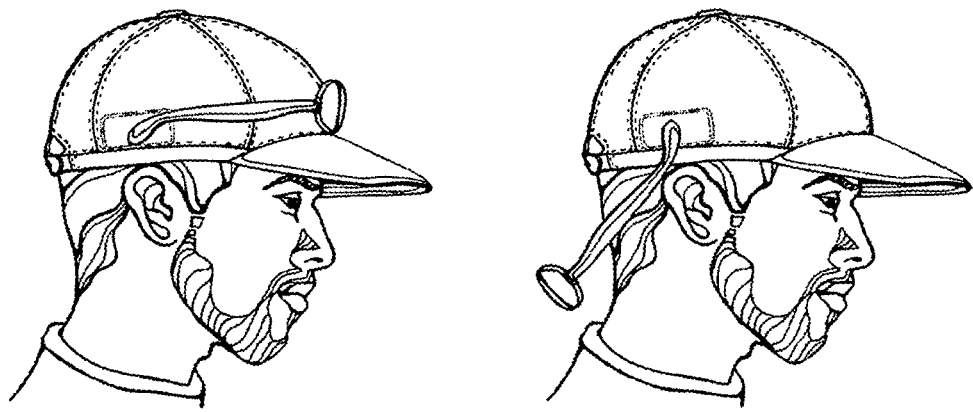
FIG. 4A illustrates the eyeglasses securing system on a user in two positions for a cap-type headwear. In one position, the eyeglasses are stored at the crown of the hat while secured to the hat with the magnetic elements. In the second position, the eyeglasses are stored backward while secured to the hat with the magnetic elements.

FIG. 4A illustrates the eyeglasses securing system on a user in two positions for a cap-type headwear. In one position, the eyeglasses are stored at the crown of the hat while secured to the hat with the magnetic elements. In the second position, the eyeglasses are stored backward while secured to the hat with the magnetic elements.

Figure 4B:
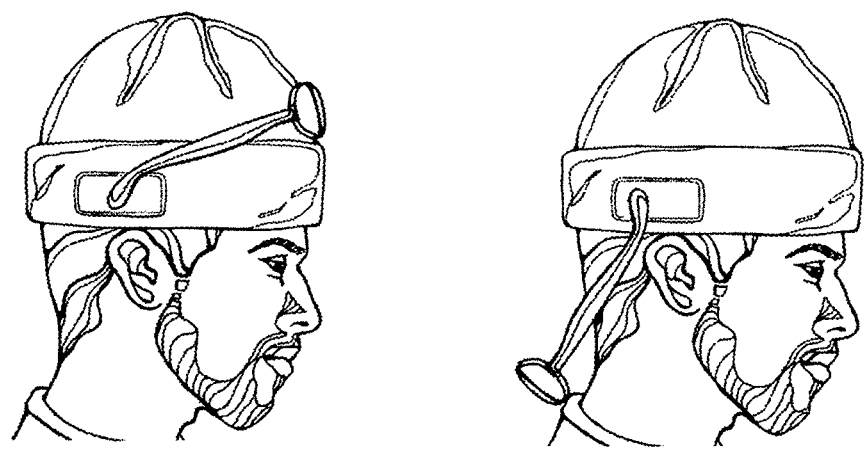
FIG. 4B illustrates the eyeglasses securing system on a user in two positions for a beanie-type headwear.

FIG. 4B illustrates the eyeglasses securing system on a user in two positions for a beanie-type headwear. In one position, the eyeglasses are stored at the crown of the hat while secured to the hat with the magnetic elements. In the second position, the eyeglasses are stored backward while secured to the hat with the magnetic elements.

Figure 5:
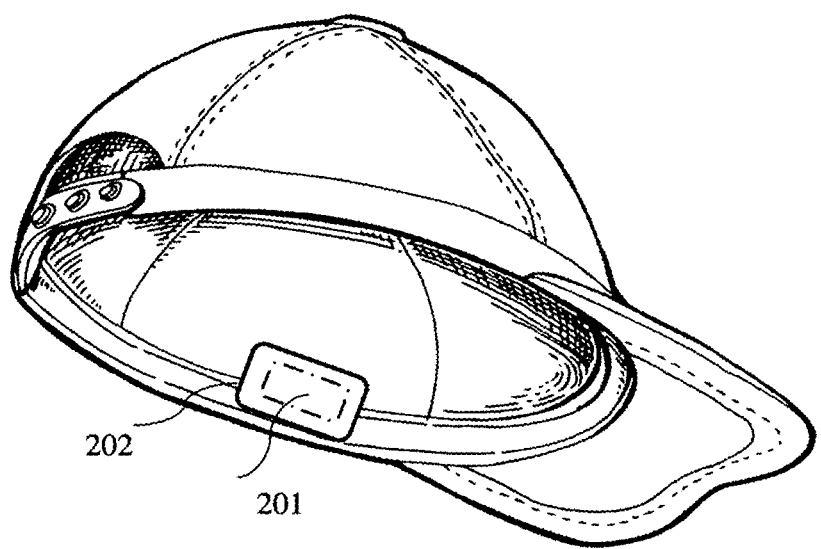
FIG. 5 is a perspective view of an embodiment of the hat portion in the eyewear securing system, where the magnetic elements are fastened to the inside of the hat.
Figure 6A:
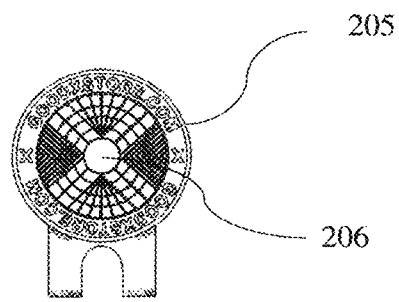
FIG. 6A is front view of an embodiment of removable hat magnetic element.
Figure 6B:
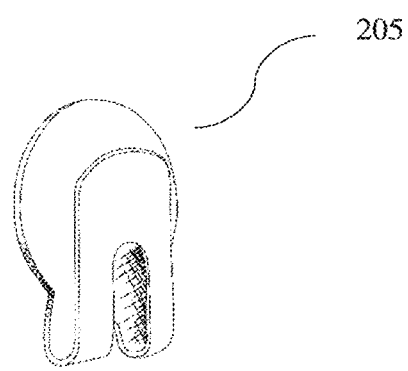
FIG. 6B is a perspective view of the embodiment of the removable hat magnetic element of FIG. 6A showing the clip structure.
Figure 6C:
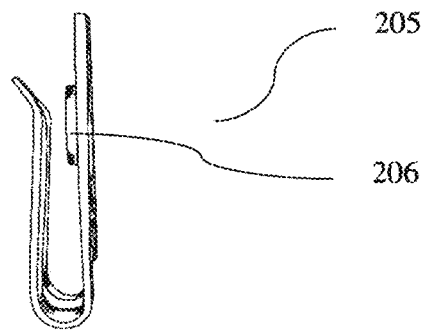
FIG. 6C is a side view of the embodiment of the removable hat magnetic element of FIG. 6A showing the clip structure.
Figure 6D:
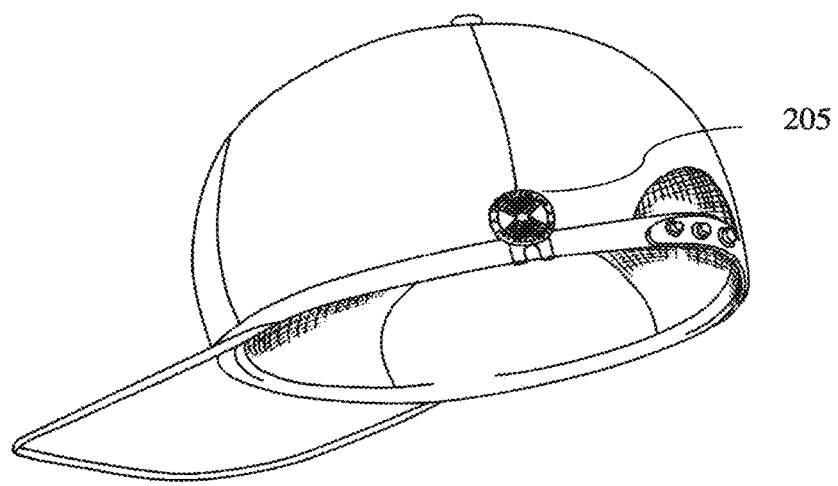
FIG. 6D is a perspective view of the removable hat magnetic element clipped to the side of the hat.
Figure 6E:
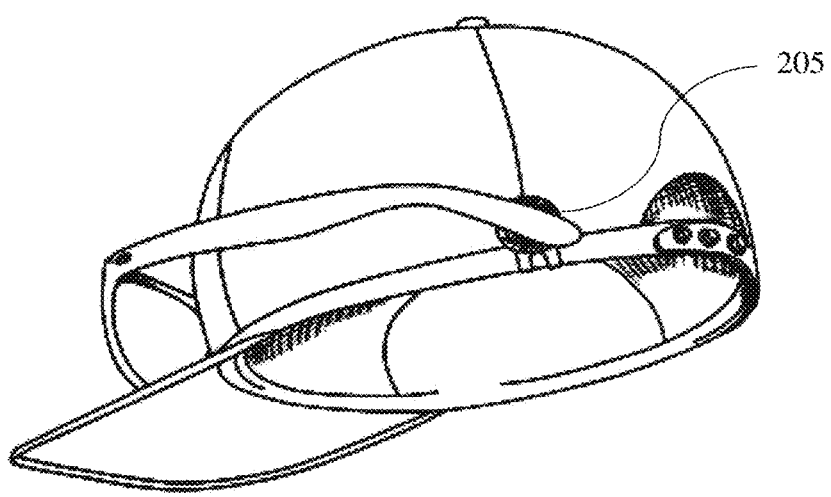
FIG. 6E is a perspective view of the removable hat magnetic element clipped to the side of the hat with the eyewear secured to the hat.

FIG. 5 is a perspective view of another embodiment of the hat portion in the eyewear securing system. In this embodiment, the hat magnetic elements (201) are fastened to the inside of the hat (200). The magnetic elements (201) can be glued to, sewn to, riveted to or attached with tabs, or otherwise fixed to the hat.

Figure 7A:
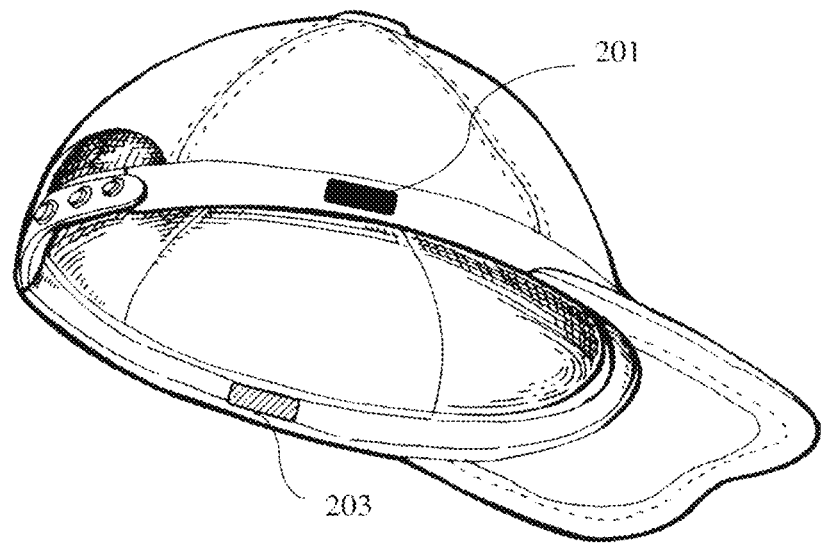
FIG. 7A is a perspective view of the embodiment of the hat portion in the eyewear securing system.
Figure 7B:
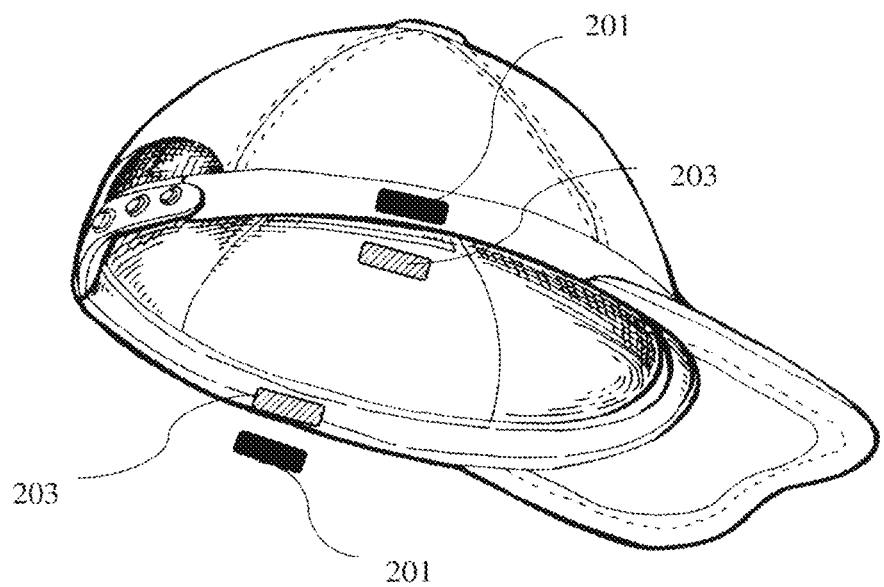
FIG. 7B is an exploded perspective view of the embodiment of the hat portion in the eyewear securing system.

FIG. 7 illustrates another embodiment of the hat portion in the eyewear securing system, where the magnetic elements are removably fastened to the two sides of the hat. The means of attachment in this embodiment comprises two pair of magnetic elements, one pair at each side of the hat (200). On each side, one magnetic element (201) is placed on the outside of the hat, while a complementary magnetic element (203) is placed on the inside of the hat. The two magnetic elements (201) and (203) are selected to form a magnetic element coupling pair so that that they attract each other when placed on the interior and exterior of the hat. Therefore, both magnetic elements (201) and (203) can be removably attached to the hat (200).

Figure 8:
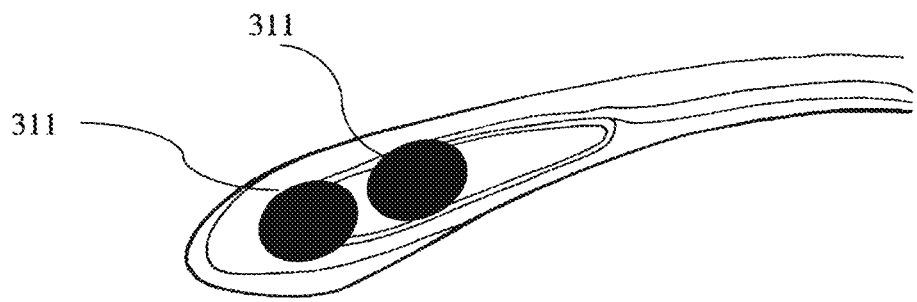
FIG. 8 is an enlarged view of the end of one of the two temple arms of an embodiment of the eyeglasses, where magnets are attached to the inside surface.

FIG. 8 shows an additional embodiments of the eyeglasses with an enlarged view of the end of one of the two temple arms of eyeglasses, where one or multiple magnetic elements (311) are attached to the inside surface.

Figure 9:
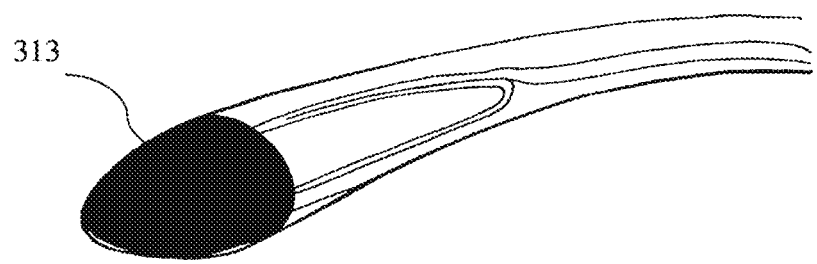
FIG. 9 is an enlarged view of the end of one of the two temple arms of an embodiment of the eyeglasses, where a portion of the end is made of or covered by magnetic material or ferrous metal.

The eyeglasses portion of the securing system can also be embodied as a pair of eyeglasses with a portion of the ends of the temple arms are made of or covered by a magnetic material. This embodiment is illustrated in FIG. 9 with an enlarged view of the end of one of the two temple arms of eyeglasses with integrated magnetic/ferromagnetic materials (313). A variation to the embodiment of FIG. 9 is when the magnetic element is completely embedded in the end portion of the temple arms of the eyeglasses.

Figure 10:
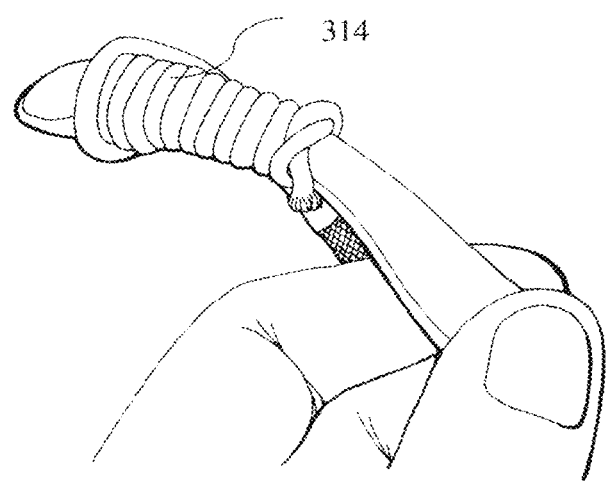
FIG. 10 is an enlarged view of the end of one of the two temple arms of an embodiment of the eyeglasses, where a roped-shaped magnetic element attachment is tied to the end portion of the temple arm.
Figure 11:
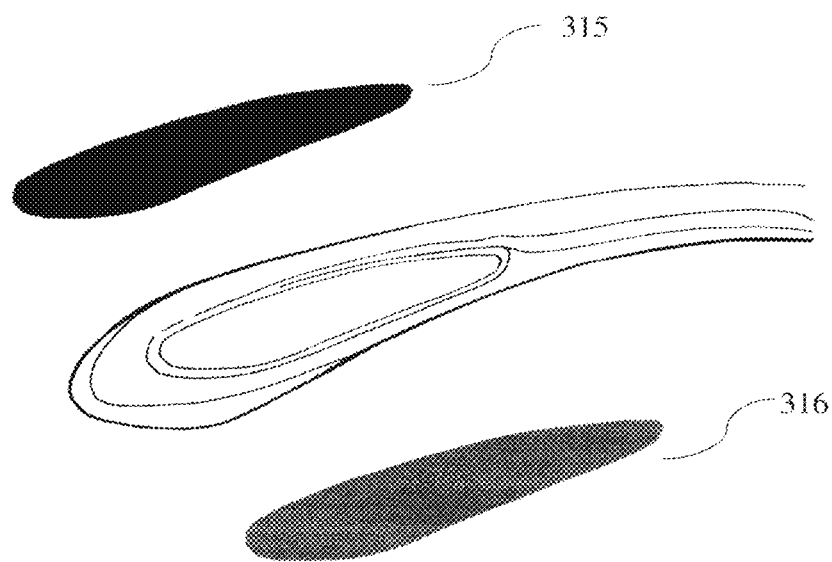
FIG. 11 is an embodiment of removable magnetic elements attached to the temple arms of the eyeglasses, where a magnetic element coupling pair is used for each temple arm of the eyeglasses.

The magnetic elements can also be removably attached to the temple arms of a pair of eyeglasses. One such embodiment is illustrated in FIG. 10, where a rope-shaped magnetic element (314) is tied to the end portion of the temple arm of the eyeglasses. Another embodiment is illustrated in FIG. 11, where two pair of magnetic elements are used with one pair at each temple arm of the eyeglasses. On one side of a temple arm of the eyeglasses, one magnetic element (315) is placed on the inside of the temple arm, while a complementary magnetic element (316) is placed on the outside of the temple arm. The two magnetic elements (315) and (316) form a magnetic element coupling pair so that they attract each other when placed on the two sides of the temple arm. Therefore, both magnetic elements (315) and (316) can be removably attached to the eyeglasses (310).

Figure 12A:
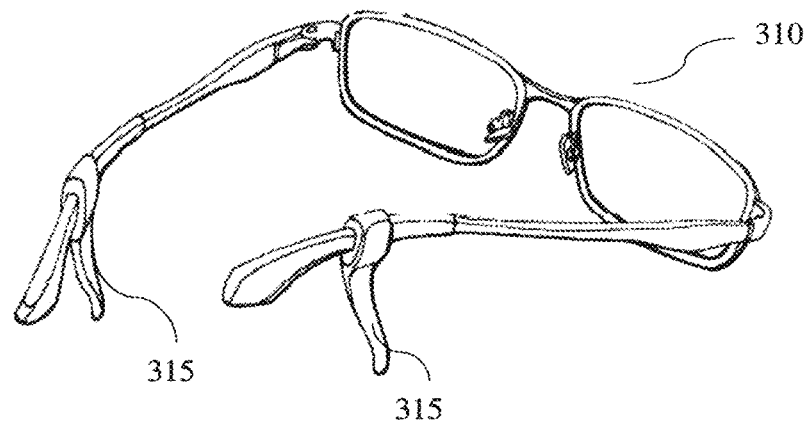
FIG. 12A is an embodiment of removable magnetic elements mechanically attached to the temple arms of the eyeglasses.
Figure 12B:
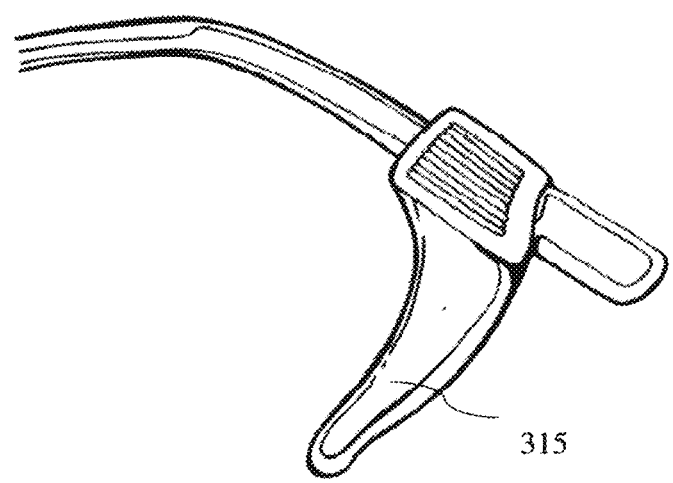
FIG. 12B is an enlarged view of the end of one of the two temple arms of the eyeglasses in FIG. 12A.

Another embodiment is illustrated in FIGS. 12A and 12B in an enlarged view of the end of one of the two temple arms of the eyeglasses. Here, the eyeglasses removable magnetic elements (315) are made completely or in part of magnetic/ferromagnetic materials. They can have a curved shaped lower portion, as illustrated in FIG. 12, in order to fit behind the wearer's ears when in use. This design is helpful in retaining the eyeglasses in place when they are in use. The top portion of the attachment has a tube shaped coupling portion through which one temple arm of the eyeglasses can be threaded through. In a preferred embodiment, this coupling portion is made of elastic or semi-elastic materials to securely fixed to one temple arm of the eyeglasses.

Figure 13A:
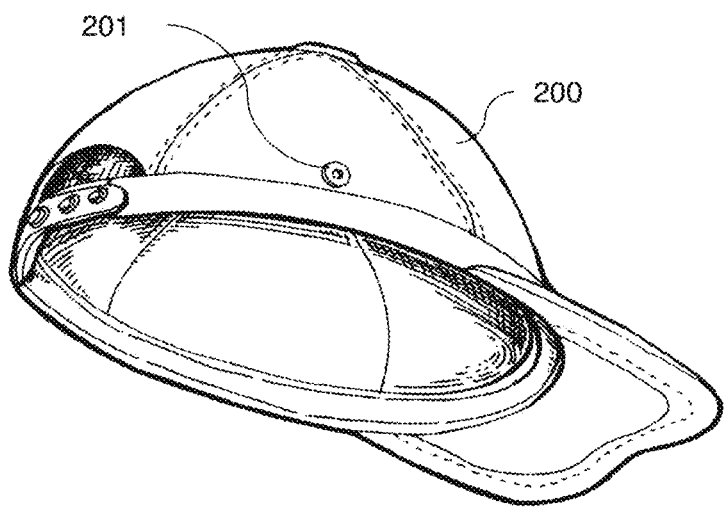
FIG. 13A is a perspective view of an embodiment of the hat portion in the eyewear securing system.
Figure 13B:
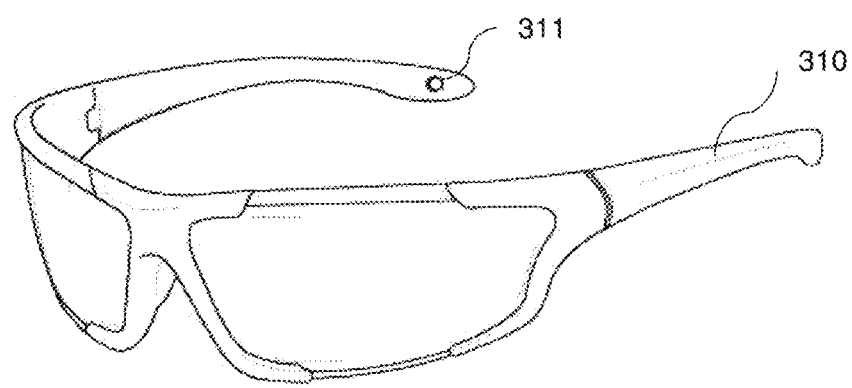
FIG. 13B is a perspective view of the eyeglasses portion in the eyewear securing system.
Figure 13C:
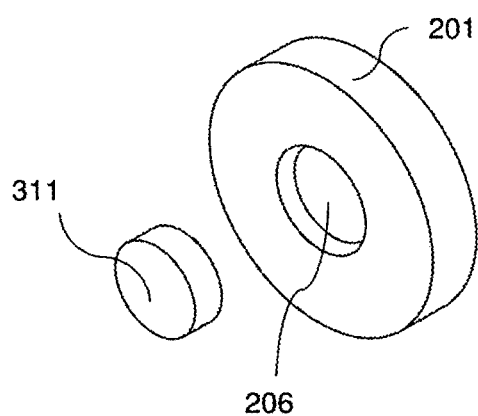
FIG. 13C is a perspective view of a magnetic element coupling pair in the embodiment in FIGS. 13A and 13B.

In another embodiment, as shown in FIGS. 13A-13C, the hat magnetic element 201 has a concavity structure 206 to receive the eyeglasses magnetic element 311. The eyeglasses magnetic element 311 is shaped to at least partially fit in the cavity 206. This geometrical arrangement prevents lateral sliding between the magnetic elements 201 and 311 and further strengthens the attraction force between the magnetic elements 201 and 311 to better secure the eyeglasses 300 to the hat 200.

FIGS. 6A-6E illustrate another embodiment of the hat portion in the eyewear securing system, where the magnetic elements are shaped as clips and can be removably fastened to the two sides of the hat. In some embodiments, the magnetic element clips 205 also comprises a concavity structure 206 to receive the eyeglasses magnetic element and prevent lateral sliding between the magnetic element pairs.

The foregoing description and accompanying drawings illustrate the principles, preferred or example embodiments, and modes of assembly and operation, of the invention; however, the invention is not, and shall not be construed as being exclusive or limited to the specific or particular embodiments set forth hereinabove.

What is claimed is:

1. An eyewear retaining system for removably attaching a pair of eyewear to a headwear, comprising:
    a pair of eyewear comprising a left temple arm having a left temple arm inner surface and a left temple arm outer surface, a right temple arm having a right temple arm inner surface and a right temple arm outer surface, a left eyewear magnetic element, and a right eyeglasses magnetic element, wherein the left eyewear magnetic element is attached to the left temple arm and the right eyewear magnetic element is attached to the right temple arm, and the left temple arm inner surface and the right temple arm inner surface approximately face each other when the pair of eyewear are worn by a user;
    a headwear comprising a left side having a left headwear inner surface and a left headwear outer surface, a right side having a right headwear inner surface and a right headwear outer surface, a left headwear magnetic element, and a right headwear magnetic element, wherein left magnetic element is attached to the left side of the headwear and the right magnetic element is attached to the right side of the headwear;
    wherein the left eyewear magnetic element and the left headwear magnetic element are arranged so that the left eyewear magnetic element and the left headwear magnetic element interact with attraction magnetic force when the inner surface of the left temple arm of the eyewear is placed adjacent to the left headwear outer surface of the left side of the headwear, the right eyewear magnetic element and the right headwear magnetic element are arranged so that the right eyewear magnetic element and the right headwear magnetic element interact with attraction magnetic force when the inner surface of the right temple arm of the eyewear is placed adjacent to the right headwear outer surface of the right side of the headwear, the left headwear magnetic element comprises a first concavity structure, so that the left eyewear magnetic element can be configured to at least partially fit in the first concavity structure of the left headwear magnetic element, and the right headwear magnetic element comprises a second concavity structure, so that the right eyewear magnetic element can be configured to at least partially fit in the second concavity structure of the right headwear magnetic element.

2. The eyewear retaining system in claim 1, wherein the left eyewear magnetic element, the right eyewear magnetic element, the left headwear magnetic element, and the right headwear magnetic element are all magnets.

3. The eyewear retaining system in claim 1, wherein the left eyewear magnetic element and the right eyewear magnetic element are magnets, and the left headwear magnetic element and the right headwear magnetic element are made of a ferromagnetic material.

4. The eyewear retaining system in claim 1, wherein the left headwear magnetic element and the right headwear magnetic element are magnets, and the left eyewear magnetic element and the right eyewear magnetic element are made of a ferromagnetic material.

5. The eyewear retaining system in claim 1, wherein the left headwear magnetic element is removably attached to the left side of the headwear, and the right headwear magnetic element is removably attached to the right side of the headwear.

6. The eyewear retaining system in claim 1, wherein the left eyewear magnetic element is removably attached to the left temple arm of the eyewear, and the right eyewear magnetic element is removably attached to the right temple arm of the eyewear.

7. An eyewear retaining system for removably attaching a pair of eyewear to a headwear, comprising a headwear comprising a left side, a right side, a left headwear magnetic element attached to the left side of the headwear, and a right headwear magnetic element attached to the right side of the headwear, wherein the left headwear magnetic element comprises a first concavity structure, so that a left eyewear magnetic element can be configured to at least partially fit in the first concavity structure of the left headwear magnetic element, and the right headwear magnetic element comprises a second concavity structure, so that a right eyewear magnetic element can be configured to at least partially fit in the second concavity structure of the right headwear magnetic element.

8. The eyewear retaining system in claim 7, wherein the left headwear magnetic element is removably attached to the left side of the headwear, and the right headwear magnetic element is removably attached to the right side of the headwear.

* * * * *